United States Patent Office 3,429,901
Patented Feb. 25, 1969

3,429,901
TELOMERIZATION PROCESS
Alden E. Blood, Joseph E. Dworsky, Jr., and Hugh J. Hagemeyer, Jr., Longview, Tex., assignors to Eastman Kodak Company, Rochester, N.Y., a corporation of New Jersey
No Drawing. Filed Jan. 5, 1965, Ser. No. 423,569
U.S. Cl. 260—410.9               6 Claims
Int. Cl. C11c 3/00; C07c 69/02, 17/20

ABSTRACT OF THE DISCLOSURE

Telomerization reactions are readily conducted in the presence of a metal oxide catalyst selected from the group consisting of an oxide of a Group I–B, II–B, V–B and VI–B and mixtures thereof. The disclosed catalyst systems provide improved telomerization reactions.

---

This invention relates to telomerization and more particularly to the novel use of certain metal oxide catalysts in telomerization reactions.

As disclosed in the patent to Hanford and Joyce, U.S. 2,440,800, the term "telomerization" is used to designate a type of reaction which can be represented as follows:

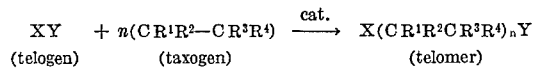

The compound XY, which supplies the end groups of the product molecule, is called a "telogen" and the polymerizable, olefinic monomer is called a "taxogen." The product is a mixture of "telomer" molecules of different chain lengths. Further information and a bibliography of literature on reactions of this type are obtainable from the publication, "Telomerization, A Review of the Literature," U.S. Department of Commerce, Office of Technical Services, PB 131930, dated Nov. 19, 1958, which publication also serves to illustrate the classes of compounds that can be used as telogens and taxogens in the process of the present invention.

The principal prior art telomerization catalysts have been peroxides. They are expensive and are consumed in the reaction. Air and oxygen theoretically are useful as telomerization catalysts and they are, of course, cheap but their catalytic activity is low and they are dangerous to use because of fire and explosion hazards.

We have now discovered that certain metal oxides can be used as catalysts for telomerization reactions, with unexpected and important advantages. The metal oxide catalysts used in accordance with our invention eliminate or reduce the drawbacks of the conventional telomerization catalysts. Their initial cost is only a small part of the cost of the useful peroxides. Unlike the peroxides, they are not consumed in the reaction, but can be reactivated and reused, so their total cost is much lower than that of the peroxides. The metal oxide catalysts can be used with air or oxygen as a cocatalyst but the amount of air or oxygen is much smaller than when air or oxygen is the sole catalyst so the hazards of explosion and fire are eliminated or reduced.

Another unexpected advantage of the metal oxide catalysts is that when they are used, the addition of the taxogen to a telogen such as an aliphatic aldehyde occurs preferentially on the alpha-carbon. For example, in the ethylene telomerization of isobutyraldehyde, using a metal oxide catalyst in accordance with our invention, the products are 2,2-dimethyl alkyl aldehydes. Prior use of free radical catalysts for this reaction has produced isopropyl alkyl ketone telomers instead of the desirable 2,2-dimethyl alkyl aldehydes which can be hydrogenated to primary alcohols that form esters of excellent stability. The difference is illustrated as follows:

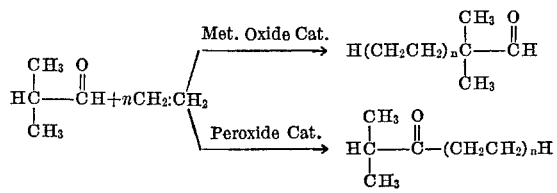

The catalysts employed in the process of our invention are oxides or mixtures of oxides of metals of Groups V–B, VI–B, I–B and II–B of the Periodic Table of the elements. Particularly useful are the oxides of zinc, copper, silver, molybdenum, chromium and vanadium, either alone or in various combinations and in the presence or absence of small amounts of oxygen. Of this group, the catalysts we have found to be the most advantageous with regard to catalyst activity, yields and catalyst cost are CuO, $Cu_2O$, $BaCuCrO_3$, $Cu_2O/CrO_3$ (65:100 wt. ratio), $Cu_2O/MoO_3$ (65:100 wt. ratio), $CuO/Cr_2O_3$ (1:1 wt. ratio), $CrO_3/Al_2O_3$ (4:1 wt. ratio), $CrO_3/Al_2O_3/Cu_2O$ (4:1:5 wt. ratio) and $Cr_2O_3/CuO/Al_2O_3$ (2:1:3 wt. ratio).

The $BaCuCrO_3$ catalyst of this group is a barium copper chromite reduction catalyst which is sometimes called an "Adkins catalyst." This illustrates that the catalytic oxide mixture can contain oxides other than oxides of the Periodic Table groups indicated, e.g., barium oxide, which serve as catalyst promoters or stabilizers or otherwise modify the properties of the catalyst composition.

Most outstanding of all is cupric oxide. With this catalyst we have discovered unexpectedly that we can obtain high yields, e.g., 90 percent or higher, of short chain telomers, i.e., those containing from 1 to about 5 added taxogen units.

The catalysts can be in various physical forms, for example, in powdered form or as pellets or granules. The metal oxide catalysts can be supported or unsupported, i.e., if desired, they can be used as composites with various inert catalytic supports such as pumice, alumina, kieselguhr, silica gel, charcoal and the like.

An advantage of our process is that the metal oxide catalysts can be reactivated. The catalyst is taken from the reaction zone when its activity becomes too low for economical operation and is reactivated by heating in air at an elevated temperature. The temperature depends upon the condition of the catalyst, e.g., the amount of inactivating deposits that it contains. Reactivation temperatures in the range of 300 to 1000° C. are generally suitable but the normal reactivation temperatures range from 300 to 600° C.

The telogen employed in our process, that is the non-olefinic organic compound to which the taxogen adds, can be essentially any organic compound capable of telomerization. The broad scope of the class of telogens is illustrated by the Department of Commerce publication cited above and its bibliography. The most important telogens include, for example, organic compounds having at least one α-hydrogen such as carboxylic acid esters, ketones, ethers, nitriles, and carboxylic acids and anhydrides. Also quite useful as telogens are, alcohols, aldehydes, and acetals having a hydrogen on the 1- or 2-carbon atoms and polyhalogenated hydrocarbons. Examples of such compounds include methyl isobutyrate, isobutyl isobutyrate, 2-ethylhexyl isobutyrate, methyl acetate, ethyl formate, methyl formate, acetone, isopropanol, isobutanol, acetic anhydride, diisobutyl acetal, carbon tetrachloride, carbon tetrabromide, trichloroethane, methylene chloroiodide, chloroform, hexachloroethane, methylene chloride, isobutyronitrile, formaldehyde, propionaldehyde, acetaldehyde, isobutyraldehyde, n-butyraldehyde, 2-ethylhexanol, 2,2,4-trimethylpentane-1,3-diol diisobutyrate and the like. Some of these compounds do not work as well as others because of catalyst interaction. For example, acids tend to dissolve the catalyst. Alcohols, especially secondary alcohols, tend to dehydrogenate to give aldehydes and ketones. Thus, in some reactions when starting with an alcohol telogen, the product is a mixture of telomer alcohols and telomer ketones.

The taxogens employed in our process can be any of the ethylenically unsaturated monomers of the types disclosed as taxogens in the Department of Commerce publication and its bibliography. These include olefinic hydrocarbons such as ethylene, propylene, n-butylene, isobutylene, pentene-1; diolefins such as butadiene and isoprene; and vinyl monomers such as styrene, vinyl chloride, vinyl acetate, vinylidene chloride, vinyl ethers, esters of acrylic and methacrylic acids, acrylonitrile and the like. A mixture of two or more unsaturated taxogens can be used if desired.

Best results and the most valuable products are obtained in our process when the taxogen is ethylene or propylene and the telogen is an aliphatic carboxylic acid ester or an aliphatic aldehyde, particularly lower alkyl esters of the lower alkanoic acids, having at least one α-hydrogen atom and alkanols of up to about 8 carbon atoms, e.g., acetaldehyde, n-butyraldehyde, isobutyraldehyde, 2-ethylhexanal, etc. Of all such combinations the use of ethylene with lower alkyl esters of isobutyric acid has been the most successful, in providing good conversions and yields of valuable short chain telomers with the metal oxide catalysts.

The telomerization reaction is carried out in accordance with the invention by either batch or continuous procedure. In the batch process the telogen and the powdered catalyst are charged to a reaction vessel. Air is displaced from the vessel and the mixture is heated with stirring in the presence of the taxogen. In the continuous process either a pump-around system, using a catalyst slurry, or a fixed bed system can be used. In the pump-around system the telogen, the taxogen and the catalyst are continuously introduced to and removed from the reaction vessel. The catalyst is removed from the effluent stream and is recycled with unconverted telogen and taxogen. In the fixed bed system the catalyst remains in the reaction vessel and telogen and taxogen are continuously added to the vessel and removed with the products.

The concentration of catalyst in the batch or in the continuous embodiments of our process is in the range of about 0.5 to about 20 weight percent based on the weight of telogen. The catalyst concentration is not critical, but at less than 0.5% the reaction rates are undesirably low and a concentration of more than 20% introduces mechanical problems of keeping the catalyst properly suspended. The preferred operating concentration for most of the reactions in accordane with the invention is 5 to 10 weight percent catalyst, based on the weight or telogen.

The molar ratio of telogen to taxogen in our process is determined by the molecular weight desired for the products. If products of low molecular weight, e.g., 1:1, 1:2 and 1:3 telomers, are desired the molar ratio of telogen to taxogen will be relatively high, e.g., as high as 20:1.

If products of higher molecular weight are desired, the ratio of telogen to taxation is decreased. For example, if waxes are desired, the telogen to taxogen molecular ratio can be as low as 1:30 or lower. When gaseous taxogens are used, e.g., ethylene and propylene, the molecular ratio is determined by the pressure and temperature. For example, in the telomerization of isobutyl isobutyrate with ethylene the telogen to taxogen molecular ratio range of 20:1 to 1:30 represents reaction pressures at 280° C. from about 800 to about 20,000 p.s.i.g.

The temperature at which the reaction is carried out can be in the range of 150 to 400° C. However, we have found that the reaction rate is undesirably slow below 200° and an undesirable amount of decomposition occurs with most reactants above 300° C. Accordingly, best results are obtained in the range of 200° to 300° C. The usual operating temperature is in the range of 250 to 270° C. The use of metal oxide catalysts for telomerization is not limited to any narrow pressure range. The pressure can range, for example, from as low as about 400 p.s.i.g. to 20,000 p.s.i.g. or higher, whether the taxogen is a normally gaseous or a normally liquid substance. However, as disclosed in copending application of Blood and Hagemeyer, Ser. No. 144,634, filed October 12, 1961, when an isobutyric acid ester is the telogen, good yields of short chain telomers are obtained at low to moderate pressures in the range of 400 to 3,000 p.s.i.g. The catalysts of the present process are particularly useful with the reactants and reaction conditions of said application Ser. No. 144,634. These include using as telogens isobutyric acid esters, $CH_3CH(CH_3)COOR$, wherein R is an alkyl, cycloalkyl, aralkyl or aryl radical (e.g. methyl, ethyl, propyl, isopropyl, isobutyl, n-butyl, sec-butyl, t-butyl, amyl, isoamyl, cyclopentyl, cyclohexyl, phenyl, tolyl, benzyl, etc.), using ethylene or propylene as the taxogen and reaction pressures in the ranges of 400 to 3,000 p.s.i.g. and preferably 500 to 2,000 p.s.i.g. With such procedure one obtains as telomer products the 2,2-dimethyl alkanoic acid esters of short chain length, e.g., 6 to 12 carbon atoms, that can be reduced to 2,2-dimethyl alkanols that are useful in making esters and sulfonates, of good thermal and hydrolytic stability.

Furthermore, one of the advantages of the metal oxide catalysts is that they can be successfully used at rather low pressures even with telogens other than the isobutyric acid esters. Thus, whereas conventional telomerization catalysts have required pressures above about 3,000 p.s.i.g. when using telogens other than isobutyric acid esters, we can now operate with good results with a number of telogens at pressures in the range of 800 to 3,000 p.s.i.g., especially when using our preferred cupric oxide catalysts. As a result, we can obtain the short chain, normally liquid telomers, in contrast to the long chain, high molecular weight, waxy products which are generally less valuable and which are usually the sole or principal products obtained in high pressure processes. In fact, in contrast to the prior art peroxide catalysts, our metal oxide catalyst produces an unexpectedly high proportion of telomer having a single added taxogen unit, e.g., in telomerizing ethylene with an isobutyric acid ester a substantially higher yield of the 2,2-dimethylhexanoic acid ester is obtained than would be obtained with a peroxide catalyst.

The examples which follow further illustrate the process of the invention.

Examples 1–20

The reaction conditions and results of Examples 1–20 are listed in Table I and illustrates the use of a number of metal oxides that we have found active as telomerization catalysts. The procedure in each example was as follows: to a 2-liter stainless steel stirred autoclave was added 800 g. of the telogen, isobutyl isobutyrate, and 10% (8.0 g.) of the indicated catalyst. Air was displaced from the autoclave with the gaseous olefinic taxogen, ethylene, and the autoclave was pressured to 600 p.s.i.g. When air was used as a cocatalyst, as indicated for several of the catalysts in Table I, from 20 to 50 p.s.i.g. air was admitted to the autoclave at this time. The autoclave contents were heated at 260° C. with stirring for 2 hours under the ethylene pressure developed as indicated in Table I. Chromatographic and distillation analysis were used to determine the amount of telomer products formed and Table I reports the percentage of conversion of the telogen to such telomer products.

TABLE I.—METAL OXIDE TELOMERIZATION CATALYSTS

[Isobutyl Isobutyrate-Ethylene at 260° C. for 2 hours, 10% Catalyst]

| Example Number | Catalyst | Pressure | Conversion to Telomer Products (Wt. percent) |
|---|---|---|---|
| 1 | $Cu_2O$-Air | 900 | 8.6 |
| 2 | $Cu_2O$ | 850 | 9.0 |
| 3 | CuO-Air | 1,000 | 5.6 |
| 4 | $V_2O_5$-Air | 1,200 | 7.3 |
| 5 | $MoO_3$-Air | 750 | 7.8 |
| 6 | $CrO_3$-Air | 850 | 6.3 |
| 7 | $CrO_3$ | 1,000 | 6.8 |
| 8 | $BaCuCrO_3$-Air | 1,250 | 18.8 |
| 9 | $BaCuCrO_3$ | 1,500 | 23.0 |
| 10 | $CuCrO_3$ | 1,400 | 17.5 |
| 11 | ZnO-Air | 1,500 | 7.5 |
| 12 | $Ag_2O$-Air | 1,150 | 4.8 |
| 13 | $Cu_2O/CrO_3$-65:100 | 1,000 | 18.0 |
| 14 | $Cu_2O/CrO_3$-65:100 | 810 | 20.6 |
| 15 | $Cu_2O/MoO_3$-65:100 | 865 | 17.3 |
| 16 | $Cu_2O/Cr_2O_3$-1:1 | 925 | 17.5 |
| 17 | $CuO/Cr_2O_3$-1:1 | 900 | 16.9 |
| 18 | $CrO_3/Al_2O_3$-4:1 | 1,000 | 20.4 |
| 19 | $CrO_3/Al_2O_3/Cu_2O$-4:1:5 | 1,100 | 19.0 |
| 20 | $Cr_2O_3/CuO/Al_2O_3$-2:1:3 | 1,000 | 18.6 |

Some of the catalysts of Table I were activated by heating before use. In Examples 13 and 18 the catalysts were heated at 600° C. in air for 1 hour. In Example 19 the $CrO_3/Al_2O_3$ component of the catalyst was heated at 600° C. in air for 1 hour and in Example 20 the catalyst was heated at 300° C. in air for 1 hour. Examples 1, 3–6, 8, 11 and 12 illustrate the use of oxygen (air) as a cocatalyst.

The $BaCuCrO_3$ and $CuCrO_3$ catalysts of Table I are commercial barium copper chromite and copper chromite hydrogenation catalysts. The broad class of copper-chromium oxide catalysts containing e.g., from 1 to 1,000 parts by weight of chromium per hundred parts of copper can be used with at least some degree of success in our process. These include catalysts such as those disclosed in U.S. Patents 2,137,407, 2,091,800, 2,782,243, and 2,544,771; Adkins, "Reactions of Hydrogen," University of Wisconsin Press (1937); Adkins et al. J. Am. Chem. Soc., 53, 1091 (1931); J. Am. Chem. Soc., 53, 1095 (1931); J. Am. Chem. Soc., 54, 1145 (1932); J. Am. Chem. Soc. 54, 1138 (1932); J. Am. Chem. Soc., 72, 2626 (1950). Good results are obtained with the promoted and unpromoted copper chromium oxide catalyst which are normally referred to as copper chromite and which contain copper and chromium in ratios indicated approximately by the composition $CuO.CuCr_2O_4$. Supported copper chromite catalysts for use in a fixed bed reactor, can be made by saturating large pore size, high surface area silica gel or aluminum with cupric nitrate which is then converted to cupric hydroxide. Chromic oxide is added and the catalyst is heated in a furnace at 300° C. for several hours. It is also possible to prepare the oxides directly from the nitrates by heating at about 700° C. Examples of suitable copper-chromium oxide or copper chromite catalysts are listed in the following table. The metals are reported by the manufacturer to be present as CuO, $CuCr_2O_3$ and $BaCrO_4$ but the weight percentages in the table are reported as CuO (80 M.W.), $Cr_2O_3$ (152 M.W.), and BaO (72 M.W.). They normally contain a small amount of silicate binder when in pelleted form.

TABLE II

| Catalyst | CuO, percent | $Cr_2O_3$, percent | BaO, percent |
|---|---|---|---|
| Harshaw Cu 0402T-1/8 | 35 | 38 | 10 |
| Harshaw Cu 1808T-1/8 | 42 | 38 | |
| Harshaw Cu 1107T-1/8 | 33 | 38 | 10 |
| Harshaw Cu 0203T-1/8 | 80 | 17 | |
| Girdler G-22 | 34 | 40 | 9 |

Examples 21–27

Examples 21–27 in Table III illustrate the life of a barium-copper chromite catalyst (Girdler G-22) used successively in a series of telomerization runs with isobutyl isobutyrate and ethylene. The runs were carried out as described for Examples 1–20 but under the conditions indicated in Table III. The catalyst was separated after each run and recharged to the next run without reactivation or other treatment.

TABLE III.—CATALYST LIFE, $BaCuCr_3$ CATALYST

[Initial Catalyst Concentration of 1.1 Percent]

| Example Number: | Temp. (°C.) | Pressure (p.s.i.) | Time (hrs.) | Telomer Yield (grams) |
|---|---|---|---|---|
| 21 | 260 | 2,300 | 2 | 76 |
| 22 | 270 | 3,200 | 3 | 88 |
| 23 | 250 | 2,500 | 3 | 102 |
| 24 | 250 | 2,400 | 4 | 81 |
| 25 | 250 | 2,600 | 3 | 50 |
| 26 | 250 | 2,900 | 3 | 63 |
| 27 | 255 | 1,300 | 3 | 5 |

The final yield for Examples 21–27 was 46.5 g. of telomer products per gram of catalyst. Table III indicates that the catalyst activity did not decrease excessively until the catalyst was recharged for the seventh time. Since virtually no catalyst was left after the sixth run because of mechanical losses, an even longer catalyst life can be achieved in a closed continuous system.

Example 28.—Cupric oxide catalyst

We have carried out a series of telomerization runs with our preferred catalyst, cupric oxide. We prepare this catalyst by heating cuprous oxide in air at about 300° C. or higher to oxidize it to cupric oxide. The higher temperatures afford some improvement in catalyst activity. We have used this catalyst at temperatures from 200° C. to 300° C. with good results. Thus, with isobutyl isobutyrate as the telogen and ethylene as the taxogen, at 260° C., 1000 p.s.i.g. 2 hours and 5 wt. percent cupric oxide catalyst we have obtained 20 weight percent telomers by chromatographic analysis (27 percent by distillation) with about 83 percent of the telomer product having 1, 2 or 3 added taxogen units, i.e., the 2,2-dimethylhexanoic, 2,2-dimethyloctanoic, and 2,2-dimethyldecanoic esters. At 240° C. we obtain 15 percent telomers by chromatographic analysis (27 percent by distillation) with 75 percent being of the dimethylhexanoic to dimethyldecanoic range. At 260° C. and 500 p.s.i.g., 20 percent telomers are obtained with 95 percent of the product in the dimethylhexanoic to dimethyldecanoic range. At higher temperatures and lower pressure, i.e., 290° C. and 500 p.s.i.g., the percent telomers can be raised to about 25 percent with 95 percent of the product being dimethylhexanoic, dimethyloctanoic and dimethyldecanoic esters.

Example 29

This example illustrates our continuous procedure using a catalyst slurry. The continuous process was carried out in a 2-liter stirred autoclave by pumping the telogen (isobutyl isobutyrate) containing the catalyst as a 5 percent slurry into the autoclave while withdrawing crude product. The catalyst was kept in suspension by using a pump to circulate the slurry in the feed tank. Using a 5 percent barium copper chromite (Girdler G-22) catalyst suspension, a reactor temperature of 260° C., an ethylene pressure of 1300 p.s.i.g., and an average contact time of 4 hours, the product effluent contained 20 percent telomer products. The catalyst was filtered from the reactor effluent and was recharged. When the contact time was raised to 8 hours, the reactor effluent contained 36 percent telomer products.

Example 30.—Catalyst reactivation

The expended catalyst from the continuous process in Example 29 was washed and dried. The material was heated at 600° C. in a stream of air for 3 hours. The regenerated catalyst when used in a repeat of Example 9 gave a 19.5 percent conversion to telomer products.

Example 31.—Telomerization of methyl acetate

Following the same procedure described for Examples 1–20 but replacing the isobutyl isobutyrate with 500 g. of methyl acetate there was obtained 50 grams of telomer products consisting of the telomers from methyl propionate to a soft wax melting at 50°. The catalyst was BaCuCrO₃ and no air was used.

Example 32.—Telomerization of acetone

To a 1800 ml. rocking autoclave was charged 400 g. acetone and 20 g. Girdler G–22 barium copper chromite. The air was flushed out with ethylene. The autoclave was heated at 260° under 10,000 p.s.i.g. ethylene pressure for 4 hours with rocking. Analysis of the material removed from the autoclave showed 60 percent unreacted acetone, 20 percent liquid ketones and 20 percent ketone telomer wax melting at 70° C.

Example 33.—Telomerization of isopropanol

The procedure of Example 32 was repeated replacing acetone with isopropanol. Analysis of the products showed 56 percent acetone, 5 percent isopropanol, 22.5 percent liquid products which were a mixture of alcohol and ketone telomers, and 16.5 percent solid telomer melting at 65° C. which infrared showed to be a mixture of alcohols and ketones.

Example 34.—Telomerization of isobutanol

The procedure of Example 32 was repeated except that isobutanol was used instead of acetone. Analysis of the products showed 30 percent unreacted isobutanol, 4 percent isobutyl isobutyrate, 42 percent liquid alcohol telomers, and 24 percent solid alcohol telomers melting at 63° C.

Example 35.—Telomerization of acetic anhydride

The procedure of Example 32 was reepated using acetic anhydride in place of acetone. Analysis of the products showed 40 percent unreacted acetic anhydride, 20 percent liquid anhydride telomer, and 40 percent waxy anhydride telomer.

Example 36.—Telomerization of diisobutyl acetal

The procedure of Example 32 was repeated replacing the acetone with diisobutyl acetal. Analysis of the products showed 50 percent unreacted acetal, 10 percent liquid telomers and 40 percent telomer wax.

Example 37.—Telomerization of carbon tetrachloride

The procedure of Example 32 was repeated except the acetone was replaced with a mixture of 200 grams of benzene and 200 grams of carbon tetrachloride. The analysis of the products showed 5 percent unreacted carbon tetrachloride, 45 percent liquid telomers, and 50 percent waxy chlorine containing telomer.

Example 38.—Telomerization of isobutyronitrile

The procedure described in Examples 1–20 was repeated using 398 g. isobutyronitrile, and 40 g. barium copper chromite catalyst. The telomerization was carried out at 250° C. for 4 hours under 1500 p.s.i.g. ethylene pressure. Analysis of the product showed 30 percent conversion to liquid telomers consisting of the 2,2-dimethyl-alkyl nitriles.

Example 39.—Telomerization of isobutyraldehyde

The procedure of Example 38 was repeated using isobutyraldehyde instead of isobutyronitrile. Analysis of the products showed a 16 percent conversion to 2,2-dimethylbutyraldehyde based on 2,2-dimethylbutyraldehyde and 2-methylbutane found, and 55 percent conversion to higher molecular weight telomers.

Example 40.—Telomerization of 2,2,4-trimethylpentane-1,4-diol diisobutyrate

The procedure of Example 38 was repeated using 2,2,4-trimethylpentane-1,4-diol diisobutyrate in place of the isobutyronitrile. Analysis of the product showed a 31 percent conversion to telomer products containing from one to 20 ethylene units and 9 percent conversion to higher telomer products.

Examples 41–44.—Use of taxogens other than ethylene

The runs summarized in Table IV were carried out as described for Examples 1–20 using isobutyl isobutyrate as the telogen and barium copper chromite as the catalyst without air. The results show that the oxide catalyst is suitable for a variety of taxogens.

TABLE IV

| Example Number | Telogen: Taxogen Mole Ratio | Temp. (° C.) | Time (hrs.) | Wt. percent Conversion to Telemer Products |
|---|---|---|---|---|
| 41 | 10:1 Propylene | 260 | 6 | 24 |
| 42 | 8:1 Butene-1 | 255 | 4 | 22 |
| 43 | 20:1 Styrene | 263 | 2 | 35 |
| 44 | 3:1 Vinyl Acetate | 260 | 3 | 68 |

Although the invention has been described in considerable detail with particular reference to certain preferred embodiments thereof, it will be understood that variations and modifications can be effected within the spirit and scope of the invention as described hereinabove, and as defined in the appended claims.

We claim:

1. The telomerization process which comprises subjecting to telomerization reaction conditions including a temperature of 150° to 400° C. (1) a telomerizable organic telogen selected from the group consisting of (a) carboxylic acid esters, ketones, ethers, nitriles, carboxylic acids, and carboxylic acid anhydrides which telogens have at least one α-hydrogen atom; (b) alcohols, aldehydes and acetals of which telogens at least one of the 1- and 2-carbon atoms has at least one hydrogen atom attached; and (c) polyhalogenated hydrocarbons; and (2) an ethylenically unsaturated taxogen in the presence of a metal oxide catalyst selected from the group consisting of supported and unsupported oxides of copper, chromium, vanadium, zinc, silver, and molybdenum, and mixtures thereof.

2. The telomerization process which comprises subjecting to telomerization conditions, including a temperature of 150 to 400° C., and a pressure of 400 to 20,000 p.s.i.g., an organic telogen selected from the group consisting of lower alkyl esters of lower alkanoic acids having at least one α-hydrogen atom and alkanals of up to about 8 carbon atoms with a taxogen selected from the group consisting of ethylene and propylene, the molar ratio of telogen to taxogen being in the range of about 20:1 to 1:30, and in the presence of 0.5 to 20 weight percent, based on the telogen, of a metal oxide catalyst selected from the group consisting of supported and unsupported oxides of copper, chromium, vanadium, zinc, silver and molybdenum.

3. The telomerization process which comprises subjecting to telomerization conditions, including a temperature of 150 to 400° C. and a pressure of 800 to 3,000 p.s.i.g., an isobutyric acid ester and ethylene, the molar ratio of ester to ethylene being in the range of about 20:1 to 1:30, and in the presence of a metal oxide catalyst selected from the group consisting of supported and unsupported oxides of copper, chromium, vanadium, zinc, silver and molybdenum.

4. The telomerization process which comprises subjecting to telomerization conditions, including a temperature of 200° to 300° C. and a pressure of 800 to 3,000 p.s.i.g., an isobutyric acid ester and ethylene, the molar ratio of ester to ethylene being in the range of about 20:1 to 1:30, and in the presence of about 0.5 to 20 weight percent, based on the ester, of a metal oxide catalyst selected from the group consisting of supported and unsupported oxides of copper and chromium.

5. The process according to claim 4 in which the catalyst is cupric oxide.

6. The process according to claim 4 in which oxygen is used as a cocatalyst.

References Cited
UNITED STATES PATENTS 2,402,137   6/1946   Sanford et al. _____ 260—488

JAMES A. PATTEN, *Primary Examiner.*

JAMES NIELSEN, *Assistant Examiner.*

U.S. Cl. X.R.

260—488, 491, 597, 604, 658, 465.3, 615, 642, 545